(No Model.) 3 Sheets—Sheet 1.
J. MACPHAIL.
CULTIVATOR.
No. 508,433. Patented Nov. 14, 1893.
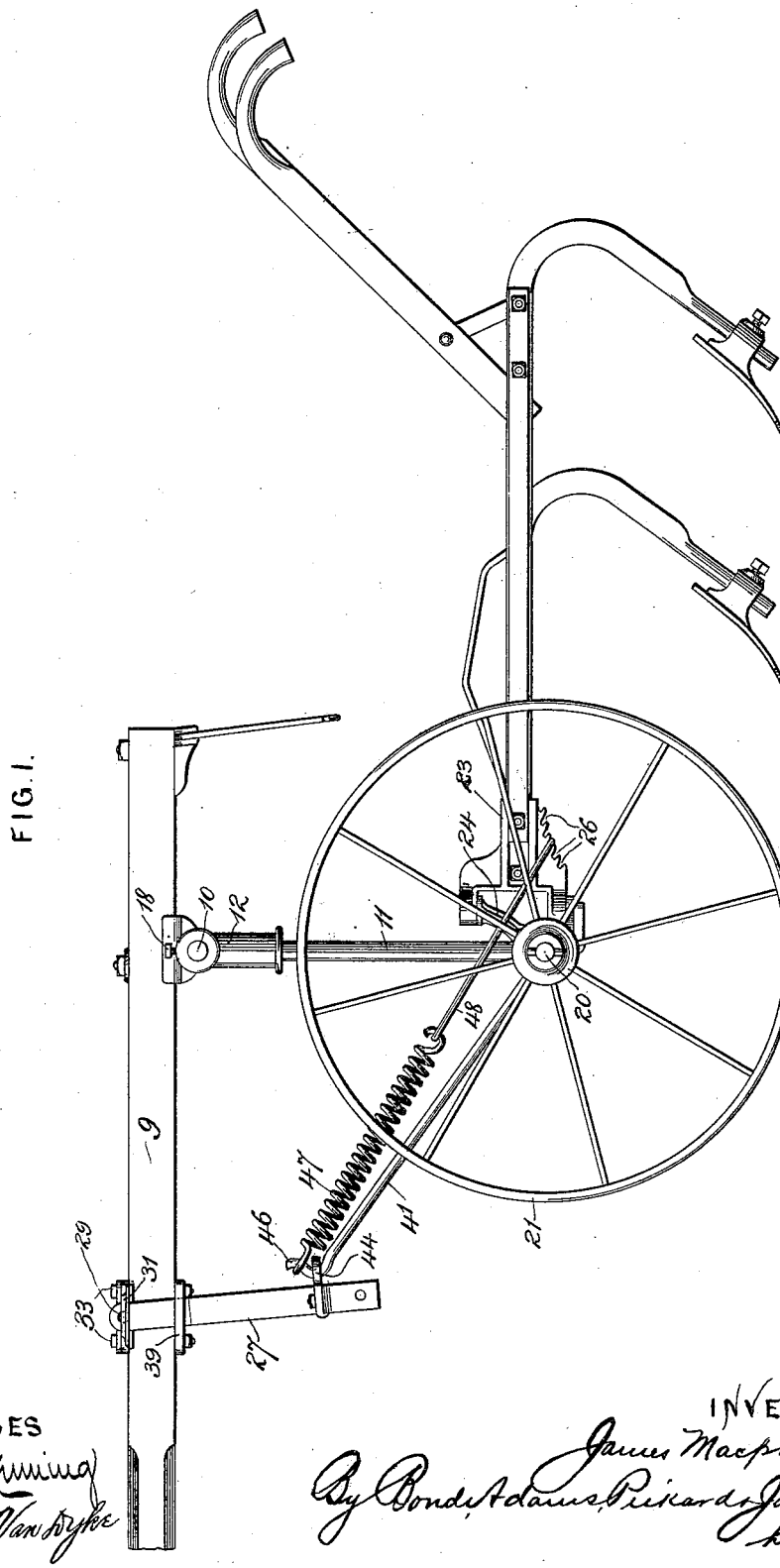
FIG. I.
WITNESSES
INVENTOR

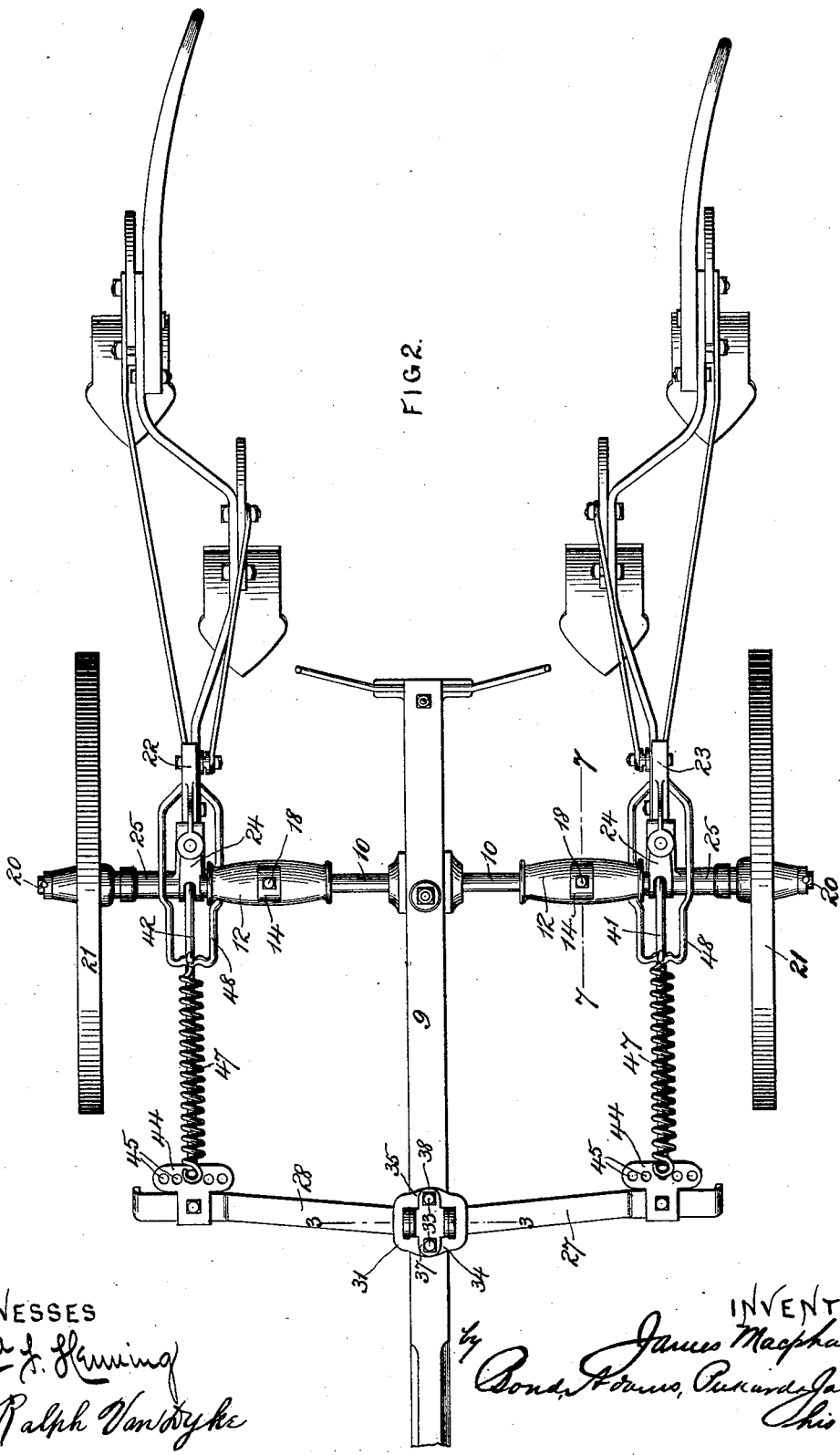

(No Model.) 3 Sheets—Sheet 3.
J. MACPHAIL.
CULTIVATOR.
No. 508,433. Patented Nov. 14, 1893.
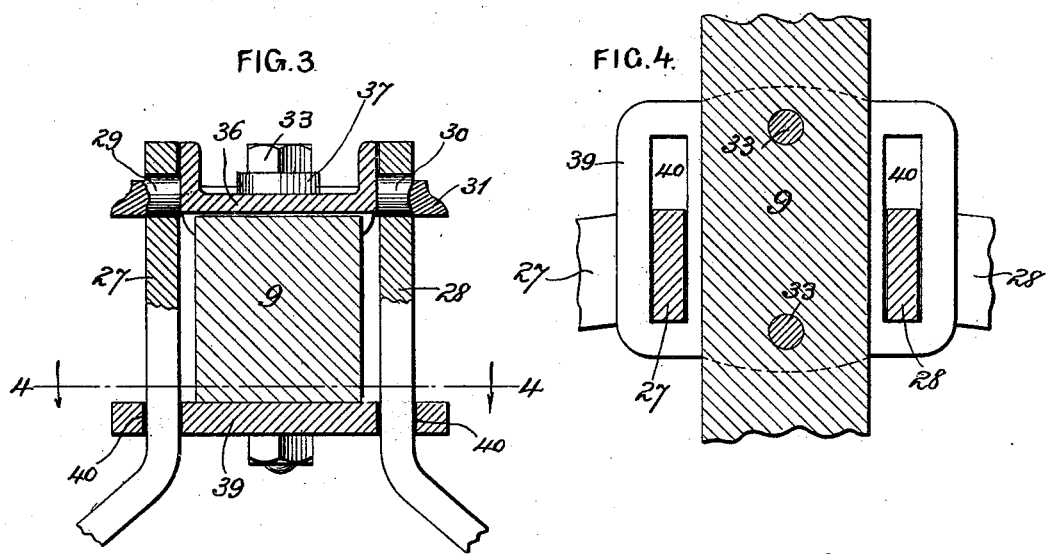
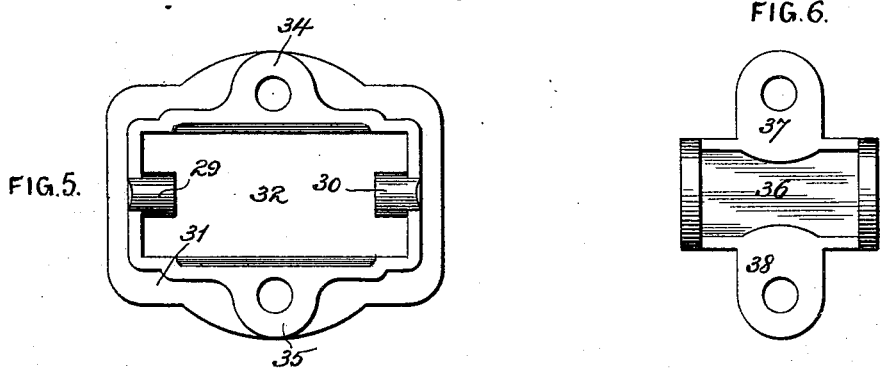
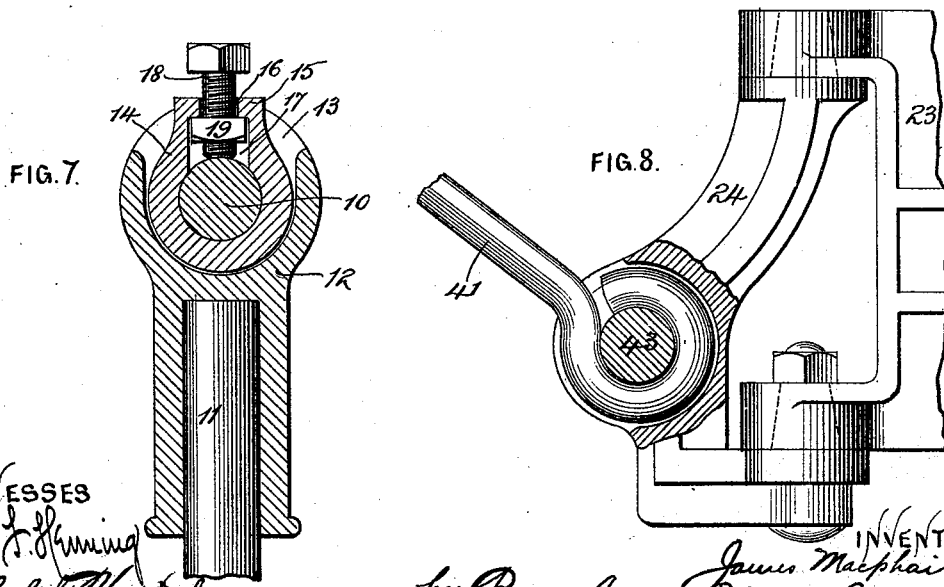

UNITED STATES PATENT OFFICE.

JAMES MACPHAIL, OF ROCKFORD, ASSIGNOR TO ABRAM ELLWOOD, OF DE KALB, ILLINOIS.

CULTIVATOR.

SPECIFICATION forming part of Letters Patent No. 508,433, dated November 14, 1893.

Application filed June 1, 1893. Serial No. 476,272. (No model.)

*To all whom it may concern:*

Be it known that I, JAMES MACPHAIL, a citizen of the United States, residing at Rockford, county of Winnebago, State of Illinois, have invented certain new and useful Improvements in Cultivators, of which the following is a specification, reference being had to the accompanying drawings, in which—

Figure 1 is a side elevation. Fig. 2 is a plan view. Fig. 3 is an enlarged detail, being a vertical section on line 3—3 of Fig. 2. Fig. 4 is a horizontal section on line 4—4 of Fig. 3. Fig. 5 is a plan view of the plate to which the singletree sustaining arms are pivoted. Fig. 6 is a plan view of the locking plate for preventing the singletree sustaining arms from becoming displaced. Fig. 7 is an enlarged detail, being a vertical section on line 7—7 of Fig. 2; and Fig. 8 is an enlarged detail, being a view of one of the cultivator beam couplings, part being in section, showing the method of securing the draft rod to the coupling.

My invention relates to cultivators; and has for its principal object to provide new and improved draft devices in which the action of the horses will be more nearly independent of each other.

Another object of my invention is to provide improved devices for carrying the cultivator springs, so that the springs may be readily placed in position or removed, but when placed in position will not be likely to become disconnected, also to provide means for adjusting the tension of the springs and their action upon the cultivator beams to which they are attached.

Another object of my invention is to provide a new and improved locking device for locking the upright portions of the axle to the horizontal portion thereof, so that the width of the arch may be more readily adjusted, and by which the parts may be firmly secured together. I accomplish these objects as hereinafter specified and as illustrated in the drawings. That which I regard as new will be set forth in the claims.

In the drawings,—9 indicates the tongue of a cultivator, the rear end of which is carried by the cultivator arch, which consists of a horizontal bar 10 and vertical bars 11, as shown in Figs. 1 and 2. The vertical bars 11 carry at their upper ends sleeves 12, which are fitted upon the horizontal bar 10 at opposite sides of the tongue 9, as shown in Fig. 2. Each sleeve 12 is provided at its upper side with a central recess 13 in which is fitted a second sleeve 14 which encircles the horizontal bar 10, as shown in Fig. 7, and each sleeve 14 is provided at its upper side with a boss 15, in which is a bolt hole 16, and in the sleeve is a cavity 17, as shown in Fig. 7.

18 indicates a bolt, which passes through the bolt hole 16 and is adapted to bear against the upper side of the rod 10.

19 indicates a nut mounted upon the bolt 18 inside the cavity 17, the arrangement being such that when the nut 19 is screwed upon the bolt 18 the edges of the nut will bear against the upper side of the cavity 17, thereby forcing the end of the bolt firmly into contact with the rod 10 and locking the sleeve 14 in place upon the rod 10. By this construction the vertical rods 11 may be spaced any desired distance apart and locked firmly in position. The rods 11, at their lower ends, are bent at right angles, or have secured to them rods extending at right angles, to which rods are attached the spindles 20 which carry the cultivator wheels 21, as shown in Fig. 2.

22—23 indicate cultivator gangs of any desired construction, which gangs are each provided with a coupling 24 connected to a sleeve or pipe box 25 mounted upon the lower horizontal portions of the rods 11, as shown. Each coupling 24 is provided on its under side with a series of notches 26 running on an incline from the lower forward end of the coupling to its rear end, as shown in Fig. 1. The notches 26 serve to retain the spring connections, as will be more fully hereinafter described.

27—28 indicate singletree sustaining arms, which are mounted at opposite sides of the tongue 9 at a point forward of the cultivator wheels, as shown in Figs. 1 and 2. The singletree sustaining arms 27—28 are pivotally supported at their upper ends by studs 29—30 carried at opposite sides of a plate 31, as best shown in Figs. 3 and 5. The plate 31 is provided with a central opening 32, and the studs 29—30 project inward from opposite sides of the plate, as best shown in Fig. 5. The plate 31 is adapted to fit upon the upper side of the tongue 9, as shown in Fig. 3, and to be secured thereto by bolts 33, which pass through ears 34—35 carried by said plate, as shown in Fig. 5.

36 indicates a locking plate, the length of which is equal to the space between the studs 29—30, so that said plate will be adapted to fit into the opening 32 between said studs, as shown in Fig. 3. The plate 36 is provided with ears 37—38, having holes which register with the bolt holes in the ears 34—35, so that the bolt 33 may pass through the holes in both pairs of ears, and thereby secure the plate 36 in place upon the plate 32, and at the same time secure the plate 32 upon the tongue 9. By this construction, when the singletree sustaining arms are pivoted upon the studs 29—30 and the plate 36 is placed in position between said studs, the singletree sustaining arms cannot be removed without first removing the locking plate 36. To limit the forward and rear movement of the singletree sustaining arms I provide a plate 39, which is secured to the under side of the tongue 9 under the plate 31. The plate 39 is somewhat wider than the tongue 9, and is provided at each side with a slot 40, as shown in Fig. 4. The singletree sustaining arms 27—28 pass through the slots 40, and as such slots are somewhat longer than the width of the singletree sustaining arms a limited backward and forward movement of such arms is permitted.

41—42 indicate draft rods, the rear ends of which are pivotally connected to pins 43 carried by the cultivator couplings 24, as best shown in Fig. 8. The forward ends of the rods 41—42 are connected to the lower ends of the singletree sustaining arms through plates 44, which are secured to said singletree sustaining arms, and are provided with holes 45 adapted to receive the ends of the rods 41—42. The forward ends of the rods 41—42 are bent to form hooks 46, which pass through the holes 45, as shown in Figs. 1 and 2.

47 indicates springs, one of which is carried at each side of the cultivator, its front end being caught over the hook 46, its rear end being connected to a stirrup 48, which is adapted to enter the notches 26 in the cultivator coupling 24. The springs 47 serve to assist in raising the cultivator shovels and in regulating the pressure of the shovels upon the ground, thereby to a certain extent determining the depth of cultivation. By securing the forward ends of the springs 47 of the hooks 46 they are held securely, but may readily be detached when desired.

By providing the cultivator with a separate singletree sustaining arm at each side the draft of each horse is applied directly to the gangs at the side of the cultivator to which he is hitched, which is a desirable feature.

That which I claim as my invention, and desire to secure by Letters Patent, is—

1. The combination with a tongue 9, of a plate 31 adapted to be secured thereto, said plate having inwardly projecting studs 29—30, and singletree sustaining arms pivoted upon said studs, substantially as described.

2. The combination with a tongue 9, of a plate 31 adapted to be secured thereto, said plate having inwardly projecting studs 29—30, singletree sustaining arms pivoted upon said studs, and a plate 36 adapted to be secured upon said plate 31 between said studs, substantially as described.

3. The combination with a tongue 9, and singletree sustaining arms pivotally supported thereby, of a plate 39 secured to said tongue, said plate having slots 40 adapted to receive said singletree sustaining arms and to limit the backward and forward motion thereof, substantially as described.

4. In a cultivator, the combination with a tongue, an arched axle, and singletree sustaining arms, of a cultivator beam, a coupling therefor, said coupling having a series of notches 26 running on an incline from its lower forward end to its lower rear end, a draft rod, a spring 47, and a stirrup connected to said spring and adapted to enter said notches 26, substantially as described.

5. The combination with a rod 10, and a sleeve-12 having a recess 13, of a sleeve 14 mounted in said recess 13 and encircling said rod 10, said sleeve 14 having a cavity 17, a bolt hole 16, a nut 19 in said cavity, and a bolt 18 adapted to receive said nut, substantially as described.

6. The combination with a rod 10, and a sleeve 12 mounted thereupon, said sleeve having a recess 13, of a sleeve 14 mounted in said recess and encircling said rod, and means for binding said sleeve 14 upon said rod, substantially as described.

JAMES MACPHAIL.

Witnesses:
S. M. HUNT,
F. W. SMITH.